(No Model.)

D. HORN.
Pitman-Rod of Mowing-Machine.

No. 227,254.                    Patented May 4, 1880.

WITNESSES:
Chas. Nida
C. Sedgwick

INVENTOR:
D. Horn
BY Munn & Co
ATTORNEYS.

UNITED STATES PATENT OFFICE.

DAVID HORN, OF MOHECANVILLE, OHIO.

PITMAN-ROD OF MOWING-MACHINES.

SPECIFICATION forming part of Letters Patent No. 227,254, dated May 4, 1880.

Application filed March 19, 1880. (No model.)

*To all whom it may concern:*

Be it known that I, DAVID HORN, of Mohecanville, Ashland county, State of Ohio, have invented a new and Improved Pitman-Rod of Mowing-Machines, of which the following is a specification.

The object of my invention is to provide a new and improved pitman-rod for mowing-machines, so constructed that its bearings can be easily adjusted in case they become worn out.

The invention consists in a pitman-rod with a circular beveled adjustable socket, into which a beveled circular stud on the cutter-head of the mowing-machine fits at one end, and a beveled aperture into which a beveled sleeve or thimble mounted on a pin of the pitman-wheel passes at the other end.

Figure 1:
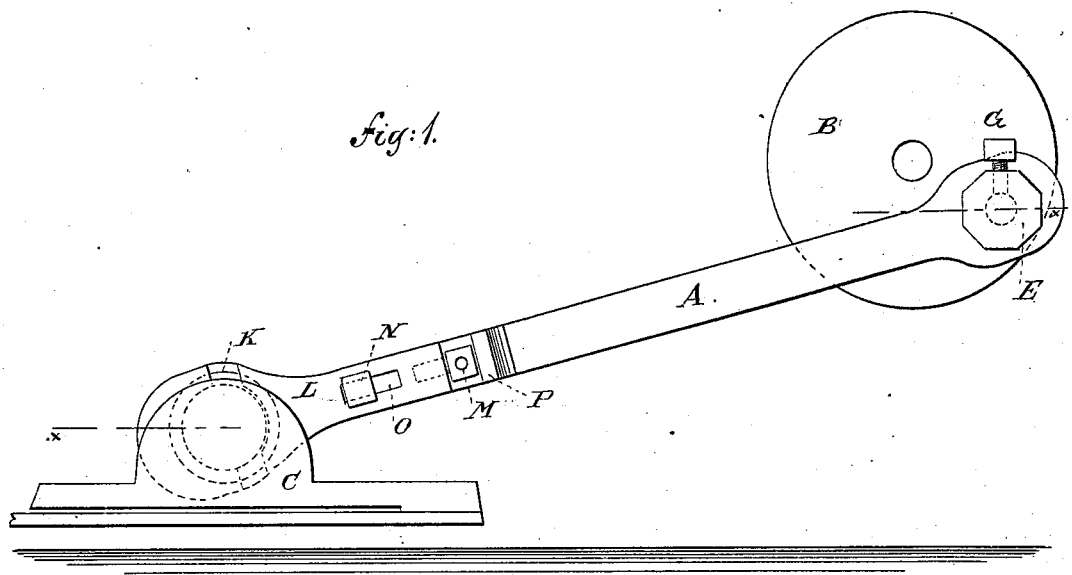
Figure 2:
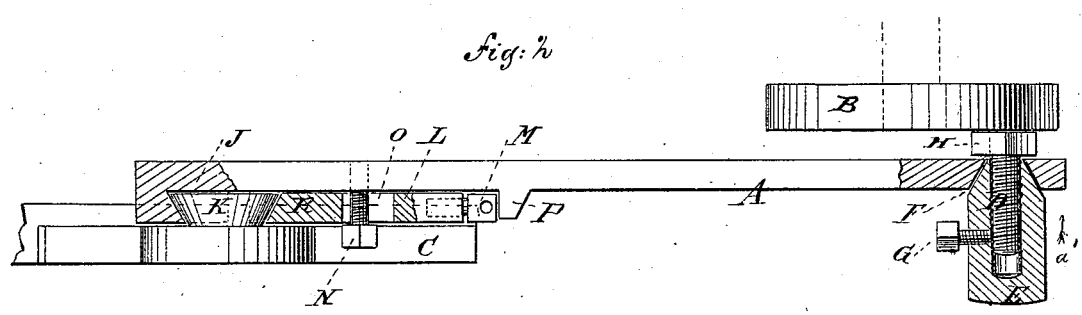
Figure 3:
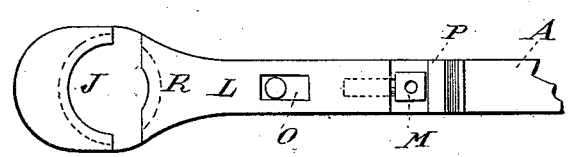

In the accompanying drawings, Figure 1 is a side elevation of my improved pitman-rod. Fig. 2 is a plan view of the same, showing parts in horizontal section; and Fig. 3 is an elevation of the inner side of that end of the rod attached to the cutter-head.

The rod A connects the pitman-wheel B and the cutter-head C of a mowing-machine, and must be suitably pivoted in each in order to transmit the rotary motion of the pitman-wheel into reciprocating motion, which the cutter must have; but the bearings of the rod A are very liable to become worn off, and for this reason I have constructed them so that they can be adjusted as rapidly as they wear off. A threaded pintle, D, projects outward from the pitman-wheel B, and upon this pintle a sleeve or thimble, E, the front end of which is tapered and fits into a conical aperture, F, in one end of the pitman-rod A, is mounted and held in place thereon by a binding-screw, G. A washer, H, is mounted on the pintle D, next to the pitman-wheel B, so as to keep the pitman-rod a sufficient distance from the wheel to prevent the two from coming in contact and bearing against each other.

The other end of the pitman-rod is provided with a semicircular beveled socket, J, into which one-half of a beveled circular stud, K, on the cutter-head fits. This stud K should preferably be made integral with the cutter-head, but can be attached thereto in some suitable manner. A sliding piece, L, being rounded and beveled at its forward end, R, and provided with a set-screw, M, at its rear end, is held to the pitman-rod by a screw, N, passing through a slot, O, in the piece L and taking in the pitman-rod A. The set-screw M rests against a shoulder, P, on the pitman-rod.

The operation is as follows: If the bearing of the pitman-rod A on the sleeve or thimble E becomes worn out, the binding-screw G is loosened, the sleeve or thimble E is moved in the direction of the arm $a'$ in some suitable manner until its bevel lies against the bevel of the aperture F, and then the set-screw G is turned down again to hold the sleeve or thimble in this position. If the bearing of the pitman-rod on the cutter-head becomes worn out the binding-screw N is loosened, the set-screw M is turned until the front curved beveled end R of the sliding piece L is in contact with the beveled circular stud K, and the set-screw N is then turned down again.

In the above-described manner the bearings can be adjusted as often as may be desired with very little trouble and expense.

Having thus described my invention, I claim as new and desire to secure by Letters Patent—

1. The combination of the threaded pintles D on wheel B, the internally-threaded thimble E, having conical end, the pitman having conical apertures F, the binding-screw G, and the washer H, as shown and described.

2. The combination of a pitman having the semicircular socket J, the cutter-head having the beveled circular stud K, the round slotted sliding piece L, beveled at the forward end, and the set-screw M, as shown and described.

3. The combination, with the pitman-rod A, provided with a semicircular beveled socket at the end, of the beveled circular stud K on the cutter-head and the adjustable slide L, provided with a beveled curved end, substantially as herein shown and described, and for the purpose set forth.

4. The combination, in a pitman-rod, with the sliding piece L, of the set-screw M, the shoulder P, and the binding-screw N, substantially as herein shown and described, and for the purpose set forth.

DAVID HORN.

Witnesses:
 DAVID A. OTTO,
 JOHN W. PIERCE.